United States Patent
Fujiwara et al.

(10) Patent No.: US 12,476,567 B2
(45) Date of Patent: Nov. 18, 2025

(54) MOTOR CONTROL DEVICE

(71) Applicant: Panasonic Intellectual Property Management Co., Ltd., Osaka (JP)

(72) Inventors: Hiroshi Fujiwara, Osaka (JP); Kenta Murakami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 254 days.

(21) Appl. No.: 18/249,732

(22) PCT Filed: Dec. 8, 2021

(86) PCT No.: PCT/JP2021/045122
§ 371 (c)(1),
(2) Date: Oct. 7, 2023

(87) PCT Pub. No.: WO2022/138166
PCT Pub. Date: Jun. 30, 2022

(65) Prior Publication Data
US 2024/0136965 A1 Apr. 25, 2024
US 2024/0235449 A9 Jul. 11, 2024

(30) Foreign Application Priority Data

Dec. 24, 2020 (JP) ................................. 2020-214576

(51) Int. Cl.
*H02P 25/06* (2016.01)
*H02K 11/21* (2016.01)

(52) U.S. Cl.
CPC ............. *H02P 25/06* (2013.01); *H02K 11/21* (2016.01)

(58) Field of Classification Search
CPC ......... H02P 25/06; H02P 27/08; H02K 11/21; B66C 13/46; B66C 13/48; B25J 9/1628; G05B 19/19

(Continued)

(56) References Cited

U.S. PATENT DOCUMENTS 8,508,160 B2 * 8/2013 Shoda .................... G05B 11/42
  318/560
8,773,061 B2 * 7/2014 Taka ......................... H02P 8/30
  318/696

(Continued)

FOREIGN PATENT DOCUMENTS

EP     1231178 A2     8/2002
JP    2014-203365    10/2014

(Continued)

OTHER PUBLICATIONS

International Search Report of PCT application No. PCT/JP2021/045122 dated Feb. 1, 2022.

(Continued)

*Primary Examiner* — David Luo
(74) *Attorney, Agent, or Firm* — Rimon P.C.

(57) ABSTRACT

Motor control device controls motor that moves load to a target position. Motor control device includes prediction part, correction command generator, corrector, and controller. Prediction part acquires one or more target position deviations and a target settling time, and calculates a predicted target position deviation indicating a difference between a position of load and the target position at the target settling time based on the one or more target position deviations and the target settling time. When the predicted target position deviation indicates that load does not reach within a predetermined range from the target position, correction command generator generates a correction command for correcting a position command based on the predicted target position deviation. Corrector acquires the position command, corrects the position command based on the correction command, and generates a corrected position command Controller controls motor based on the corrected position command and a position of motor.

11 Claims, 9 Drawing Sheets

(58) Field of Classification Search
USPC .................................................. 318/632, 560
See application file for complete search history.

(56) References Cited

U.S. PATENT DOCUMENTS

| | | | |
|---|---|---|---|
| 9,360,851 B2 * | 6/2016 | Futami | .................... H02P 23/22 |
| 2014/0301632 A1 | 10/2014 | Ikeda et al. | |
| 2022/0148845 A1 | 5/2022 | Ogawa et al. | |

FOREIGN PATENT DOCUMENTS

| | | |
|---|---|---|
| WO | 2017/189771 A1 | 11/2017 |
| WO | 2020/188759 A1 | 9/2020 |

OTHER PUBLICATIONS

The EPC Office Action dated Apr. 22, 2024 for the related European Patent Application No. 21910315.7.

* cited by examiner

FIG. 12

MOTOR CONTROL DEVICE

TECHNICAL FIELD

The present disclosure relates to a motor control device that controls a motor.

BACKGROUND ART

A motor control device that controls a motor that positions a load at a target position is conventionally known (e.g., see PTL 1).

CITATION LIST

Patent Literature

PTL 1: Unexamined Japanese Patent Publication No. 2014-203365

SUMMARY OF THE INVENTION

When the load is moved to the target position, the load is desired to be quickly positioned within a predetermined range from the target position.

Thus, it is an object of the present disclosure to provide a motor control device capable of controlling a motor to achieve quick positioning of a load within a predetermined range from a target position.

A motor control device according to an aspect of the present disclosure controls a motor that moves a load to a target position based on a position command for instructing a position of the motor. The motor control device includes a prediction part, a correction command generator, a corrector, and a controller. The prediction part acquires one or more target position deviations each indicating a difference between a position of the load and the target position at a corresponding one of one or more times, and a target settling time indicating a target time at which the motor positions the load at the target position. Then, a predicted target position deviation indicating a difference between a position of the load at the target settling time and the target position is calculated based on the one or more target position deviations and the target settling time. When the predicted target position deviation indicates that the load does not reach within a predetermined range from the target position, the correction command generator generates a correction command for correcting the position command based on the predicted target position deviation. The corrector acquires the position command, corrects the position command based on the correction command, and generates a corrected position command. The controller controls the motor based on the corrected position command and a position of the motor.

The above configuration provides a motor control device capable of controlling a motor to quick movement of a load from a target position to a predetermined range.

DESCRIPTION OF EMBODIMENT

Background to Obtain an Aspect of the Present Disclosure

PTL 1 describes a control system that positions a load without exceeding a target position. This control system includes a servo unit for controlling a motor that positions a load, the servo unit controlling the motor based on an internal command from a main control unit that is a host controller. This control system positions the load without exceeding the target position as follows: causing the motor to decelerate positioning speed of the load when the load approaches the target position; repeatedly performing imaging of the load and image processing of the captured image; and feeding back a result of the image processing to an internal command every time the image processing is performed.

When the control system for positioning the load can position the load within a predetermined range from the target position, the control system does not necessarily need to position the load without exceeding the target position. This kind of system is desired to position the load quickly.

Thus, the inventors have conducted intensive studies and experiments on a motor control device capable of controlling a motor to achieve quick positioning of a load within a predetermined range from a target position. As a result, the inventors have conceived a motor control device below.

The motor control device according to an aspect of the present disclosure controls a motor that moves a load to a target position based on a position command for instructing a position of the motor. The motor control device includes a prediction part, a correction command generator, a corrector, and a controller. The prediction part acquires one or more target position deviations each indicating a difference between a position of the load and the target position at a corresponding one of one or more times, and a target settling time indicating a target time at which the motor positions the load at the target position. Then, a predicted target position deviation indicating a difference between a position of the load at the target settling time and the target position is calculated based on the one or more target position deviations and the target settling time. When the predicted target position deviation indicates that the load does not reach within a predetermined range from the target position, the correction command generator generates a correction command for correcting the position command based on the predicted target position deviation. The corrector acquires the position command, corrects the position command based on the correction command, and generates a corrected position command. The controller controls the motor based on the corrected position command and a position of the motor.

The motor control device having the above configuration acquires one or more target position deviations and a target settling time, and corrects a position command based on the acquired one or more target position deviations and target settling time. Thus, the motor control device having the above configuration does not need to cause a host controller side to feed back information related to a position of the load, the host controller side being configured to output a position command to a motor drive device. Thus, the motor control device having the above configuration is capable of controlling the motor to achieve quick positioning of the load within a predetermined range from the target position. The motor control device having the above configuration also does not necessarily need to decelerate the positioning speed of the load even when the load approaches the target position. Thus, the motor control device having the above configuration is capable of controlling the motor to achieve quicker positioning of the load within the predetermined range from the target position.

The one or more target position deviations may be multiple target position deviations including a first target position deviation at a first time and a second target position deviation at a second time. The prediction part may calculate the predicted target position deviation based on the first time, the second time, the first target position deviation, and the second target position deviation.

As a result, the motor can be controlled relatively accurately based on the amount of change in the target position deviation per part time.

The prediction part may calculate the predicted target position deviation by linear interpolation performed using the first time, the second time, the first target position deviation, and the second target position deviation.

As a result, the predicted target position deviation can be calculated with a relatively small amount of calculation.

The multiple target position deviations may further include a third target position deviation at a third time. The prediction part may calculate the predicted target position deviation by secondary interpolation performed using the first time, the second time, the third time, the first target position deviation, the second target position deviation, and the third target position deviation.

As a result, the predicted target position deviation can be calculated with relatively high accuracy.

The correction command may instruct a correction command position shifted from a command position instructed by the position command by the predicted target position deviation.

The correction command also may instruct a correction command position shifted from a command position instructed by the position command by a difference between the predicted target position deviation and the predetermined range.

The correction command also may instruct a correction command position shifted from a command position instructed by the position command by a difference between the predicted target position deviation and a value obtained by multiplying the predetermined range by a predetermined value more than 0 and less than or equal to 1

Additionally, a target position deviation calculator that calculates the one or more target position deviations may be further provided. The target position deviation calculator may include a camera and a calculator. The camera is positioned together with the load by the motor, and captures images at respective one or more times. The calculator calculates one target position deviation corresponding to one of the images, the one target position deviation being included in the one or more target position deviations, when the target position is included in the one of the images based on the images captured by the camera.

As a result, the motor can be controlled without acquiring the target position deviation from the outside.

Hereinafter, a specific example of a motor control device according to an aspect of the present disclosure will be described with reference to the drawings. Exemplary embodiments described herein is a specific example of the present disclosure. Numerical values, shapes, constituent components, arrangement positions and connection modes of the constituent components, steps, order of the steps, and the like illustrated in the following exemplary embodiments are merely examples, and thus are not intended to limit the present disclosure. Each of the drawings is a schematic view, and is not necessarily precisely illustrated.

Comprehensive or specific aspects of the present disclosure may be achieved by a system, a method, an integrated circuit, a computer program, or a recording medium such as a computer-readable CD-ROM, or may be achieved by any combination of the system, the method, the integrated circuit, the computer program, and the recording medium.

EXEMPLARY EMBODIMENT

<Configuration>

Figure 1:
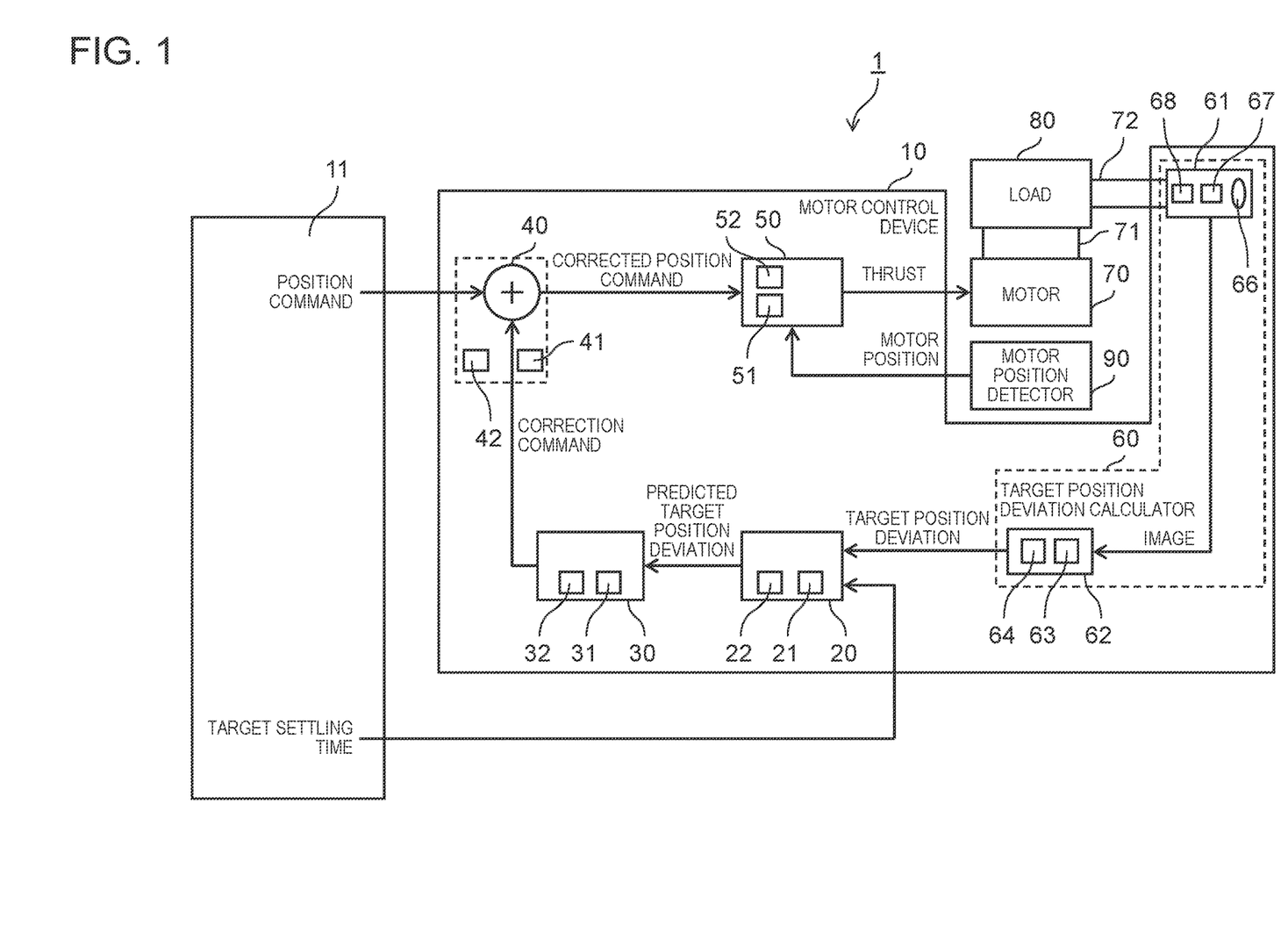
FIG. 1 is a block diagram illustrating a configuration example of a positioning system according to an exemplary embodiment.

FIG. 1 is a block diagram illustrating a configuration example of positioning system 1 according to an exemplary embodiment.

As illustrated in FIG. 1, positioning system 1 includes motor control device 10, motor 70, load 80, motor position detector 90, connecting part 71, and connecting part 72.

Motor 70 is controlled by motor control device 10 to move load 80 to a target position.

Load 80 is connected to motor 70 by connecting part 71 and moved by motor 70.

Figure 2:
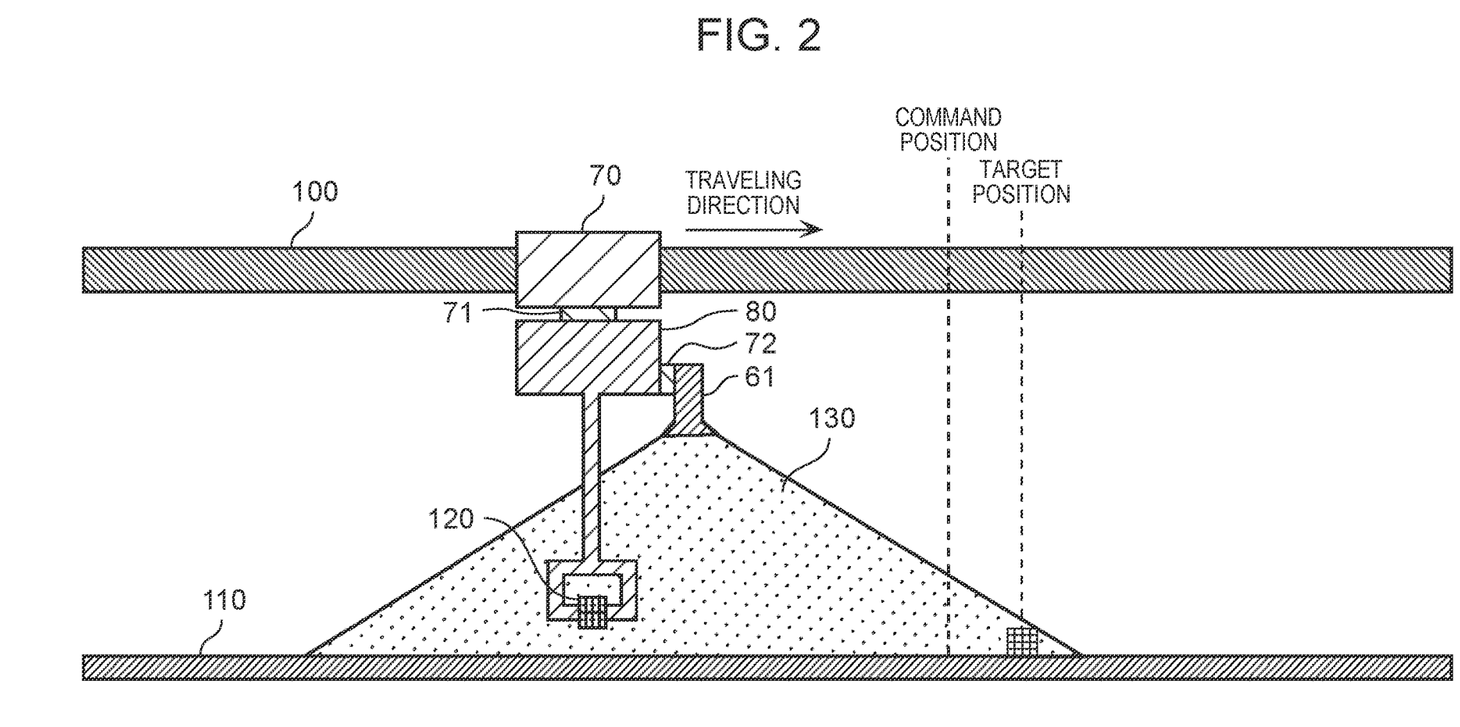
FIG. 2 is a schematic diagram illustrating an example of a state in which a motor positions a load according to an exemplary embodiment at a target position.

FIG. 2 is a schematic diagram illustrating an example of a state in which motor 70 moves load 80 to a target position. FIG. 2 is a diagram illustrating an example of a transport device.

As illustrated in FIG. 2, motor 70 is a linear motor movable along guide 100, for example. Although motor 70 will be described below as a linear motor, the motor is not necessarily limited to the example of the linear motor as long as the motor can move load 80 to a target position, and thus may be a rotary motor or a linear motion mechanism in which a rotary motor and a drive mechanism such as a ball screw are combined, for example.

As illustrated in FIG. 2, load 80 includes an arm capable of gripping work object 120 that is to be placed at a predetermined place on stage 110, for example. When load 80 is positioned at a target position by the motor 70, for example, load 80 releases gripped work object 120 at the target position to place work object 120 at a predetermined place on stage 110.

Returning again to FIG. 1, positioning system 1 will be continuously described.

Motor position detector 90 detects a position of motor 70, and outputs the detected position of motor 70 to motor control device 10. When motor 70 is a linear motor, for example, motor position detector 90 may be a linear scale. When motor 70 is a rotary motor, for example, motor position detector 90 may be an encoder. When motor 70 is a linear motor, for example, a position of the motor may be a position of a mover. For example, when motor 70 is a rotary motor, a position of the motor may be an angle of a rotor.

Motor control device 10 controls motor 70 based on a position command for instructing a position of motor 70. For example, the position command is output from host controller 11 connected to motor control device 10 via a communication line or the like.

As illustrated in FIG. 1, motor control device 10 includes prediction part 20, correction command generator 30, corrector 40, controller 50, and target position deviation calculator 60.

Target position deviation calculator 60 calculates a target position deviation indicating a difference between a position of load 80 and a target position. As illustrated in FIG. 1, target position deviation calculator 60 includes camera 61 and calculator 62.

Camera 61 is moved together with load 80 by motor 70, and captures an image at each of one or more times. That is, camera 61 is an imaging device. For example, camera 61 may include lens 66 that condenses light, solid-state imaging element 67 that converts the light condensed by the lens into an electric signal, and memory 68 that stores the electric signal converted by the solid-state imaging element.

As illustrated in FIG. 2, camera 61 is connected to load 80 by connecting part 72, for example, and captures an image of a field of view 130. When camera 61 is present at a position where a target position is included in the field of view 130, camera 61 captures an image including the target position. Although target position deviation calculator 60 in FIG. 2 includes one camera 61, it may include multiple cameras.

Returning again to FIG. 1, positioning system 1 will be continuously described.

Based on each of images captured by camera 61, when the target position is included in a target image, calculator 62 calculates a target position deviation corresponding to the target image. Calculator 62 may include processor 63 and memory 64, for example, and have functions to be implemented by processor 63 executing a program stored in memory 64.

For example, calculator 62 performs image processing on an image captured by camera 61 to determine whether the target position is included in the image. Then, when determining that the target position is included in the image, calculator 62 performs further image processing and calculates a target position deviation, for example.

Prediction part 20 acquires one or more target position deviations calculated by target position deviation calculator 60 and a target settling time indicating a target time at which motor 70 positions load 80 at the target position. The target settling time is output from host controller 11, for example. Then, prediction part 20 calculates a predicted target position deviation indicating a difference between a position of load 80 and the target position at the target settling time based on the acquired one or more target position deviations and the target settling time. Prediction part 20 may include processor 21 and memory 22, for example, and have functions to be implemented by processor 21 executing a program stored in memory 22.

For example, prediction part 20 acquires a first target position deviation at a first time and a second target position deviation at a second time as the one or more target position deviations. Then, prediction part 20 calculates the predicted target position deviation based on the first time, the second time, the first target position deviation, and the second target position deviation.

Figure 3A:
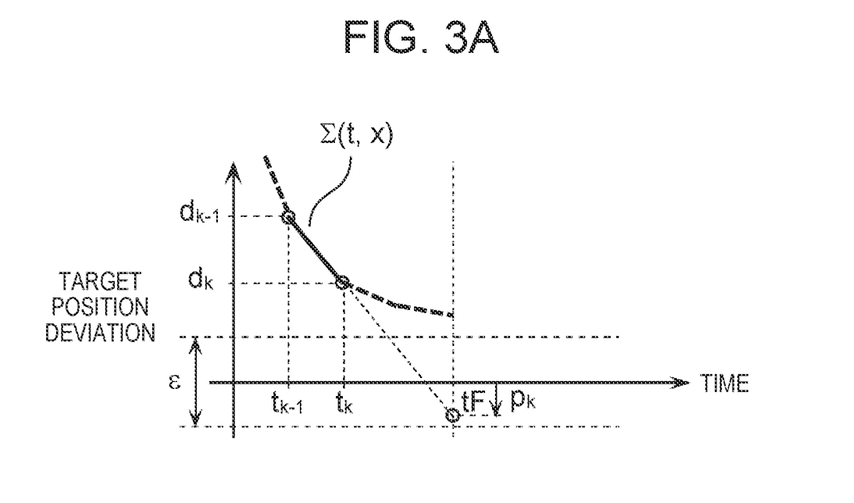
FIG. 3A is a schematic diagram illustrating an example of a state in which a prediction part according to an exemplary embodiment calculates a predicted target position deviation.
Figure 3B:
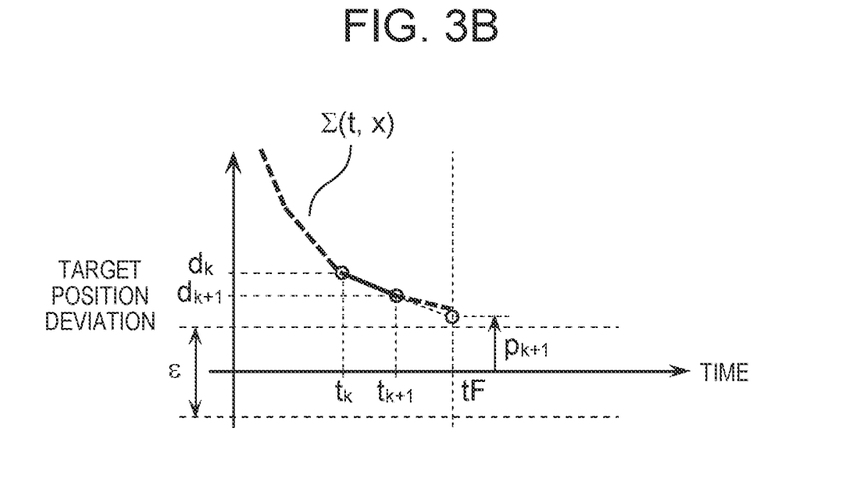
FIG. 3B is a schematic diagram illustrating an example of a state in which a prediction part according to an exemplary embodiment calculates a predicted target position deviation.

FIGS. 3A and 3B are each a schematic diagram illustrating an example of a state in which prediction part 20 calculates the predicted target position deviation. FIG. 3A is a schematic diagram in a case where a calculated predicted target position deviation indicates that load 80 reaches the target position. FIG. 3B is a schematic diagram in a case where a calculated predicted target position deviation indicates that load 80 does not reach the target position (does not exceed the target position). FIGS. 3A and 3B each have a horizontal axis representing time, and a vertical axis representing target position deviation.

Load 80 and camera 61 are moved in response to a position command. FIGS. 3A and 3B each indicate the position command expressed by a function $\Sigma(t, x)$. The function includes t representing time and x representing a target position deviation at time t. Then, tF represents target settling time. Additionally, $d_k$ (k is an integer) indicates the target position deviation at time $t_k$. The vertical axis includes 0 indicating a target position, and $\varepsilon$ indicating an allowable range centered on a predetermined position, or the target position. Motor control device 10 operates to place load 80 within a range of $\pm 0.5\varepsilon$ centered on the target position. Hereinafter, the range of $\pm 0.5\varepsilon$ centered on the target position is referred to as a "predetermined range". That is, $\varepsilon$ is a size of the predetermined range.

As illustrated in FIG. 3A, prediction part 20 performs linear interpolation by using, for example, imaging time $t_{k-1}$ of a (k−1)-th image captured by camera 61, an imaging time $t_k$ of a k-th image captured by camera 61, target position deviation $d_{k-1}$ corresponding to the (k−1)-th image captured by camera 61, and target position deviation $d_k$ corresponding to the k-th image captured by camera 61. In this way, predicted target position deviation $p_k$ indicating that load 80 reaches the target position at time tF is calculated. FIG. 3A illustrates that load 80 is predicted to reach within a predetermined range from the target position at time tF. That is, FIG. 3A indicates that predicted target position deviation $p_k$ is included in the predetermined range. The sentence, "load 80 reaches the target position at time tF", is identical in meaning to the sentence, "load 80 is predicted to reach within a predetermined range from the target position at time tF".

As illustrated in FIG. 3B, prediction part 20 performs linear interpolation by using, for example, imaging time $t_k$ of a k-th image captured by camera 61, an imaging time $t_{k+1}$ of a (k+1)-th image captured by camera 61, target position deviation $d_k$ corresponding to the k-th image captured by camera 61, and target position deviation $d_{k+1}$ corresponding to the (k+1)-th image captured by camera 61. In this manner, predicted target position deviation $p_{k+1}$ indicating that load 80 does not reach the target position is calculated. FIG. 3B illustrates that load 80 is predicted not to reach within a predetermined range from the target position at time tF. That is, FIG. 3B indicates that predicted target position deviation $p_{k+1}$ is not included in the predetermined range at time tF.

Returning again to FIG. 1, positioning system 1 will be continuously described.

When the predicted target position deviation calculated by prediction part 20 indicates that load 80 does not reach the target position, correction command generator 30 generates a correction command for correcting the position command based on the predicted target position deviation. Correction command generator 30 may include processor 31 and memory 32, for example, and have functions to be implemented by processor 31 executing a program stored in memory 32.

For example, correction command generator 30 generates a correction command for correcting the position command to instruct a correction command position shifted from the command position instructed by the position command by the predicted target position deviation.

Corrector 40 acquires a position command, and corrects the acquired position command based on the correction command generated by correction command generator 30 to generate a corrected position command. Corrector 40 may include processor 41 and memory 42, for example, and have functions to be implemented by processor 41 executing a program stored in memory 42.

Controller 50 controls motor 70 based on the corrected position command generated by corrector 40 and the position of motor 70 output by motor position detector 90. Controller 50 may include inverter 51 that generates three-phase alternating current for generating thrust in the motor, and controller 52 that controls inverter 51 by pulse width modulation (PWM), for example, and have functions to be implemented by controller 52 controlling inverter 51 by PWM based on the corrected position command and the position of motor 70.

<Operation>

Hereinafter, operation of positioning system 1 having the above configuration will be described.

Positioning system 1 instructs a command position using a position command, the command position allowing load 80 to be positioned at a target position by motor 70 moving to the command position when positioning system 1 is in an ideal state.

Unfortunately, even when motor 70 moves to the command position, load 80 may be actually positioned at a position different from the target position due to influence of deformation, thermal expansion, and the like of members constituting positioning system 1. That is, a deviation (this deviation is also referred to below as "target position deviation") may occur between an actual position of load 80 positioned by motor 70 moving to the command position and the target position.

Figure 4A:
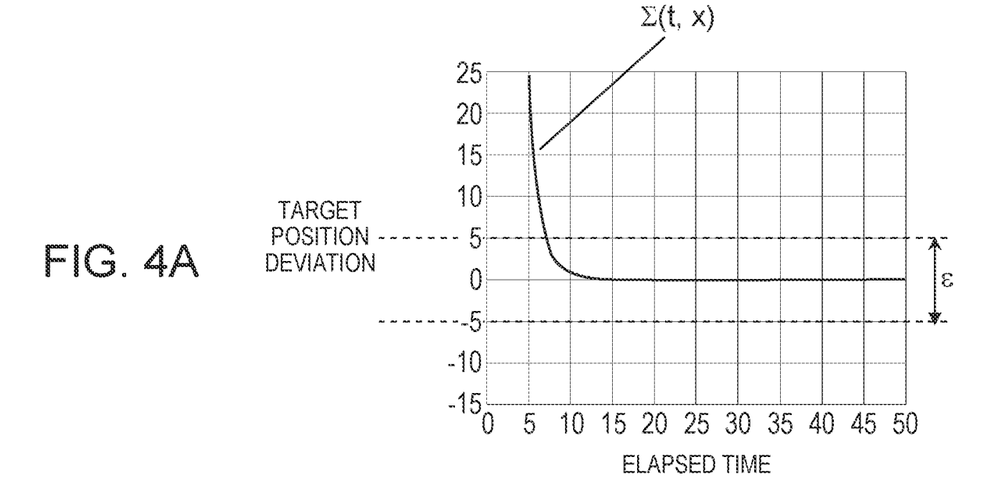
FIG. 4A is a schematic diagram illustrating an example of a state in which a load according to an exemplary embodiment is positioned at a target position.

FIG. 4A is a schematic diagram illustrating an example of a state in which motor 70 moves to the command position with no target position deviation to position load 80 at the target position when assuming that controller 50 control motor 70 based on a position command before being corrected by corrector 40 instead of the corrected position command corrected by corrector 40. FIG. 4A has a horizontal axis representing elapsed time, and a vertical axis representing target position deviation. A position with a target position deviation of 0 is the target position.

As illustrated in FIG. 4A, no target position deviation allows load 80 to be positioned at the target position without correcting the position command. FIG. 4A illustrates a curve as function Σ indicating a position command.

Figure 4B:
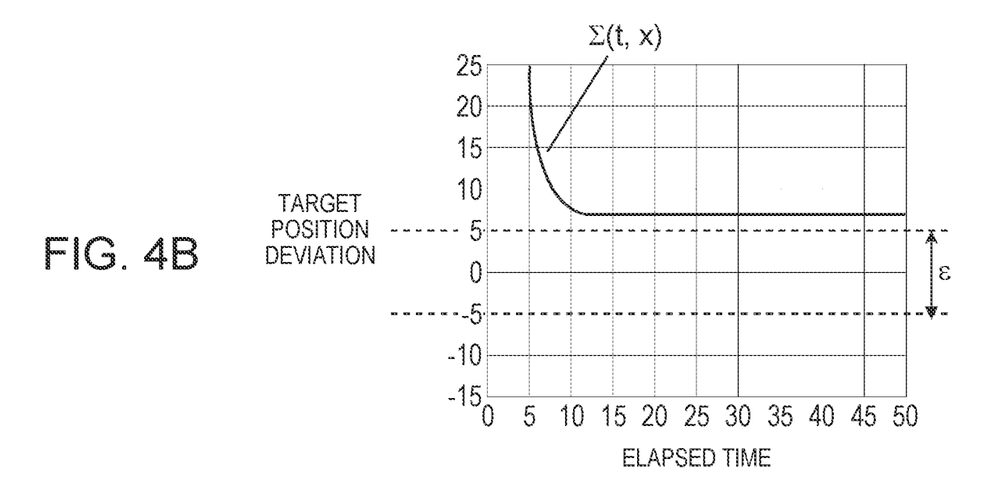
FIG. 4B is a schematic diagram illustrating an example of a state in which a load according to an exemplary embodiment is positioned at a position different from a target position.

In contrast, FIG. 4B is a schematic diagram illustrating an example of a state in which motor 70 moves to the command position with a target position deviation to position load 80 at a position different from the target position when assuming that controller 50 controls motor 70 based on a position command before being corrected by corrector 40 instead of the corrected position command corrected by corrector 40. FIG. 4B has a horizontal axis representing elapsed time, and a vertical axis representing target position deviation. A position with a target position deviation of 0 is the target position.

As illustrated in FIG. 4B, the target position deviation causes load 80 to be positioned at a position without reaching the target position, for example, unless the position command is corrected.

Positioning system 1 can position load 80 at the target position by performing position deviation correction processing by motor control device 10 even with a target position deviation that causes load 80 to be positioned at a position without reaching the target position (also referred to below as "non-positioning target position deviation") unless the position command is corrected.

Hereinafter, the position deviation correction processing performed by motor control device 10 will be described with reference to the drawings.

Figure 5:
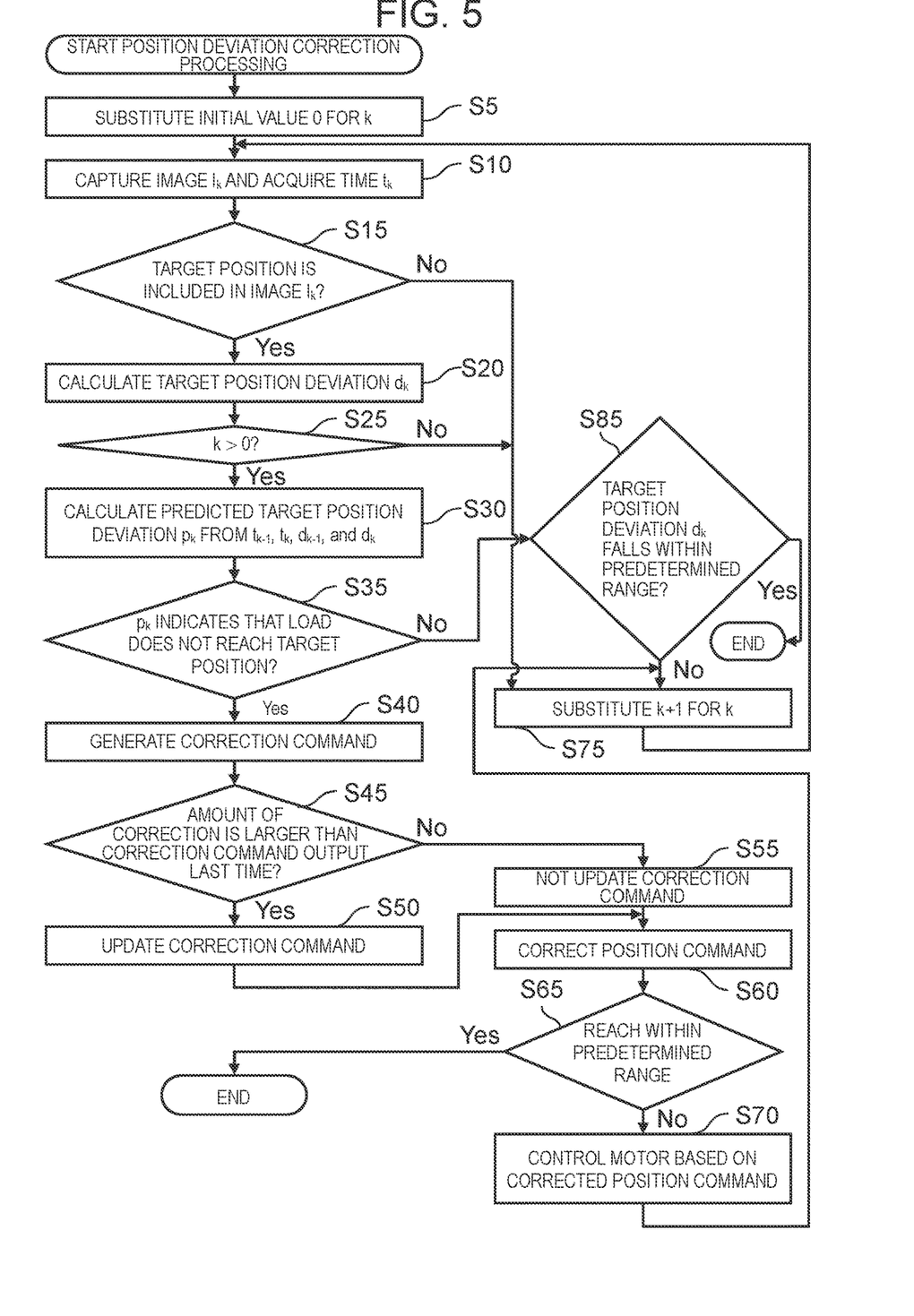
FIG. 5 is a flowchart of position deviation correction processing according to an exemplary embodiment.
Figure 7:
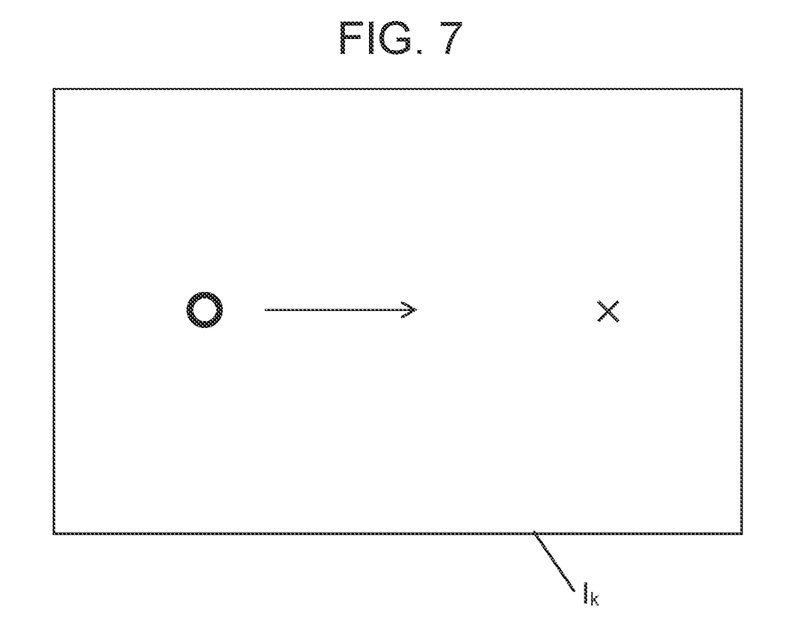
FIG. 7 is a schematic diagram illustrating an image captured by a camera provided in a load according to an exemplary embodiment.
Figure 8:
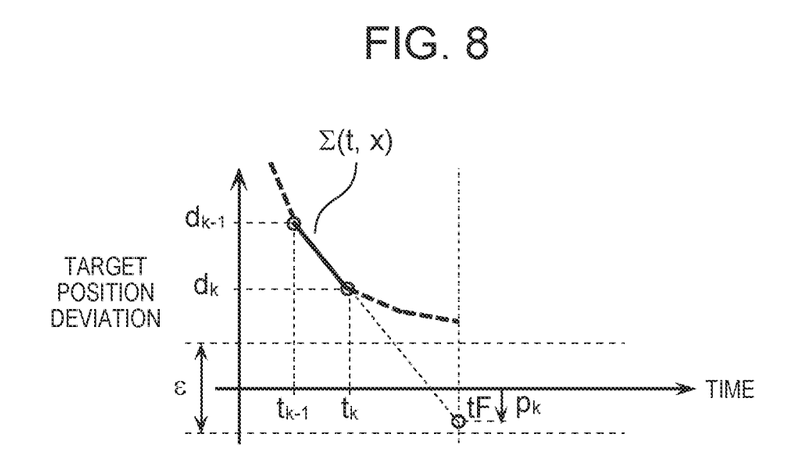
FIG. 8 is a diagram illustrating a case where a predicted target position deviation calculated in an exemplary embodiment indicates that a load reaches a target position.
Figure 9A:
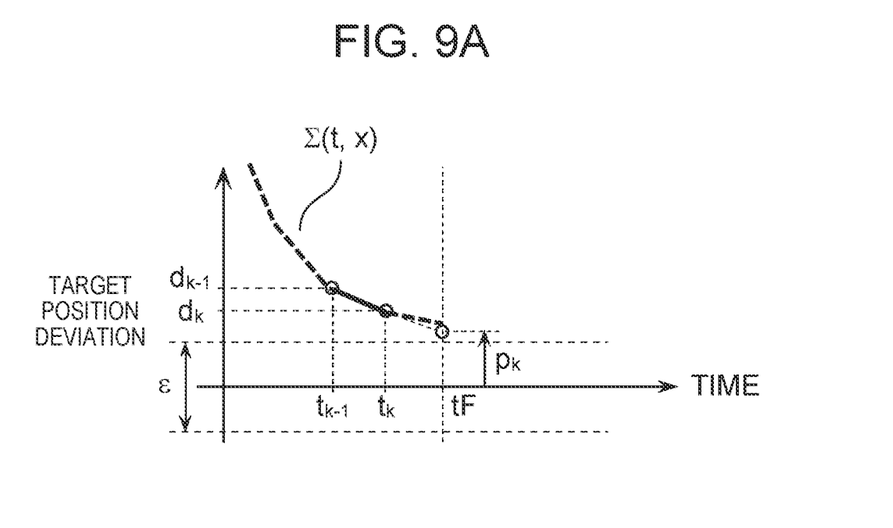
FIG. 9A is a diagram illustrating a case where a predicted target position deviation calculated in an exemplary embodiment indicates that a load does not reach a target position.
Figure 9B:
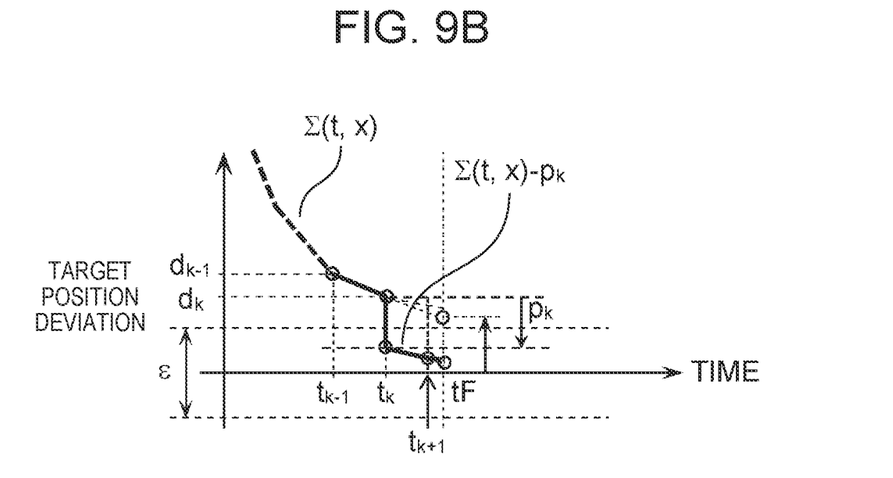
FIG. 9B is a diagram illustrating a case where a position command is corrected when a predicted target position deviation calculated in an exemplary embodiment indicates that a load does not reach a target position.

FIG. 5 is a flowchart of the position deviation correction processing. The position deviation correction processing is performed to correct the position command to prevent load 80 from being positioned at a position without reaching the target position, and control motor 70 based on the corrected position command. The position deviation correction processing may be started when calculator 62 determines that the target position is included in an image captured by camera 61, for example, or may be started when a user using positioning system 1 performs an operation to start the position deviation correction processing on motor control device 10, for example. FIG. 7 is a schematic diagram illustrating image $I_k$ at time $t_k$. FIG. 7 illustrates a circle indicating a position of load 80, a cross indicating the target position, and an arrow indicating a moving direction of camera 61. Camera 61 moves in the same direction as load 80. FIG. 8 is a diagram illustrating that load 80 is predicted at time $t_k$ to reach within a predetermined range from the target position at time tF. FIG. 8 illustrates a case where predicted target position deviation $p_k$ calculated indicates that load 80 reaches the target position. FIG. 9A is a diagram illustrating that load 80 is predicted at time $t_k$ to be unable to reach within predetermined range c from the target position at time tF. FIG. 9B is a diagram illustrating that load 80 is predicted to reach within a predetermined range from the target position at time tF by correcting the position command in the case illustrated in FIG. 9A. FIGS. 8, 9A, and 9B each illustrate $\Sigma(t, x)$ as a function indicating a position command.

When the position deviation correction processing is started in FIG. 5, motor control device 10 substitutes initial value 0 for an integer-type variable k that can take an integer value of 0 or more (step S5).

When initial value 0 is substituted for the integer-type variable k, camera 61 captures image $I_k$ and acquires time $t_k$ at which image $I_k$ has been captured (step S10).

When image $I_k$ is captured and time $t_k$ is acquired, calculator 62 performs image processing on image $I_k$ and determines whether the target position is included in image $I_k$ (step S15).

When it is determined that the target position is included in image $I_k$ in the processing of step S15 (step S15: Yes), calculator 62 performs further image processing on image $I_k$ and calculates target position deviation $d_k$ (step S20).

When target position deviation $d_k$ is calculated, motor control device 10 checks whether a value substituted for integer-type variable k is larger than 0 (step S25). When the value substituted for integer-type variable k is larger than 0 in the processing of step S25 (step S25: Yes), prediction part 20 calculates predicted target position deviation $p_k$ by performing linear interpolation using time $k_{t-1}$, time $k_t$, target position deviation $d_{k-1}$, and target position deviation $d_k$ (step S30).

When predicted target position deviation $p_k$ is calculated, correction command generator 30 determines whether calculated predicted target position deviation $p_k$ indicates that load 80 does not reach the target position (step S35). When predicted target position deviation $p_k$ calculated indicates that load 80 reaches the target position in the processing of step S35 (step S35: No, see FIG. 8), the position command is not corrected. When predicted target position deviation $p_k$ calculated indicates that load 80 reaches the target position, and target position deviation $d_k$ falls within a predetermined range (step S85), the position deviation correction processing is ended.

In contrast, when predicted target position deviation calculated $p_k$ indicates that load 80 does not reach the target position in the processing of step S35 (step S35: Yes, see FIG. 9A), correction command generator 30 generates a correction command for correcting the position command to instruct a correction command position shifted by predicted target position deviation $p_k$ from the command position instructed by the position command (step S40, see FIG. 9B). Then, correction command generator 30 determines whether the amount of correction (here, predicted target position deviation $p_k$) in the correction command being newly generated is larger than the amount of correction in the correction command being output last time (step S45).

When the amount of correction in the correction command being newly generated is larger than the amount of correction in the correction command being output last time in the processing of step S45 (step S45: Yes), correction command generator 30 updates the correction command being output last time with the correction command being newly generated (step S50), and outputs the updated correction command.

When the amount of correction in the correction command being newly generated is not larger than the amount of correction in the correction command being output last time in the processing of step S45 (step S45: No), correction command generator 30 does not update the correction command being output last time with the correction command being newly generated (step S55), and outputs the correction command being output last time.

When the processing of step S50 ends or the processing of step S55 ends, corrector 40 corrects the position command with the correction command output from correction command generator 30 (step S60) and outputs the corrected position command (see FIG. 9B). FIG. 9B illustrates function $\Sigma(t, x)$ that indicates the position command and that is corrected by $p_k$ at time $t_k$ to form function $\Sigma(t, x)-p_k$. After time $t_k$, load 80 is positioned along function $\Sigma(t, x)\Sigma p_k$ indicating the position command.

When the corrected position command is output, controller 50 determines whether the correction command position of motor 70 reaches within predetermined range c based on the corrected position command and the position of motor 70 output by motor position detector 90 (step S65). The correction command position is a position corrected by the corrected position command.

When the correction command position of motor 70 does not reach within the predetermined range in the processing of step S65 (step S65: No), controller 50 controls motor 70 based on the corrected position command and the position of motor 70 output by motor position detector 90 (step S70).

Cases (i), (ii), (iii), and (iv) below allow motor control device 10 to substitute k+1 for integer-type variable k (step S75) and allow the processing to proceed to step S10.

Case (i): The processing of step S15 results in determination that the target position is included in the image k (step S15: No).

Case (ii): Step S25 results in determination that k is equal to or less than 0 (step S25: No).

Case (iii): The processing of step S35 results in determination that predicted target position deviation $p_k$ calculated indicates that load 80 reaches the target position (step S35: No), and step S85 results in determination that target position deviation $d_k$ does not fall within the predetermined range (step S85: No).

Case (iv): The processing of step S70 ends.

When the correction command position of motor 70 reaches within the predetermined range in the processing of step S65 (step S65: Yes), motor control device 10 ends the position deviation correction processing.

The correction command position of motor 70 is synonymous with corrected target position deviation $d_k$ of load 80. That is, the correction command position of motor 70, reaching within the predetermined range, is synonymous with corrected target position deviation $d_k$ of load 80, falling within the predetermined range. Thus, step S85 shows a sentence expressed as "Target position deviation $d_k$ falls within predetermined range?".

This processing is effective only until target settling time tF.

Hereinafter, a specific example of behavior of motor control device 10 will be described with reference to the drawings, the specific example showing that motor control device 10 performs the position deviation correction processing in positioning system 1 causing the non-positioning target position deviation illustrated in FIG. 4B.

Figure 6A:
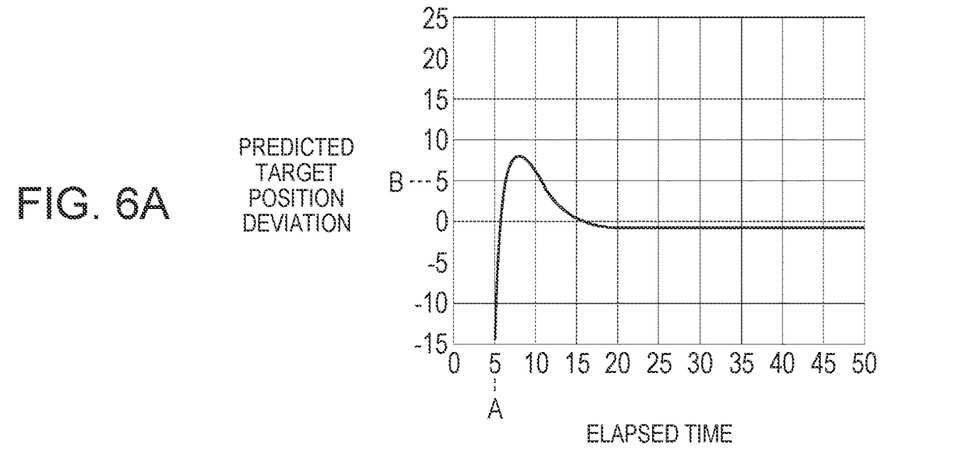
FIG. 6A is a schematic diagram illustrating an example of a temporal change of a predicted target position deviation calculated by a prediction part according to an exemplary embodiment.

FIG. 6A is a schematic diagram illustrating an example of a temporal change of a predicted target position deviation calculated by prediction part 20 when motor control device 10 performs the position deviation correction processing in positioning system 1 causing the non-positioning target position deviation illustrated in FIG. 4B. FIG. 6A has a horizontal axis representing elapsed time, and a vertical axis representing predicted target position deviation.

Figure 6B:
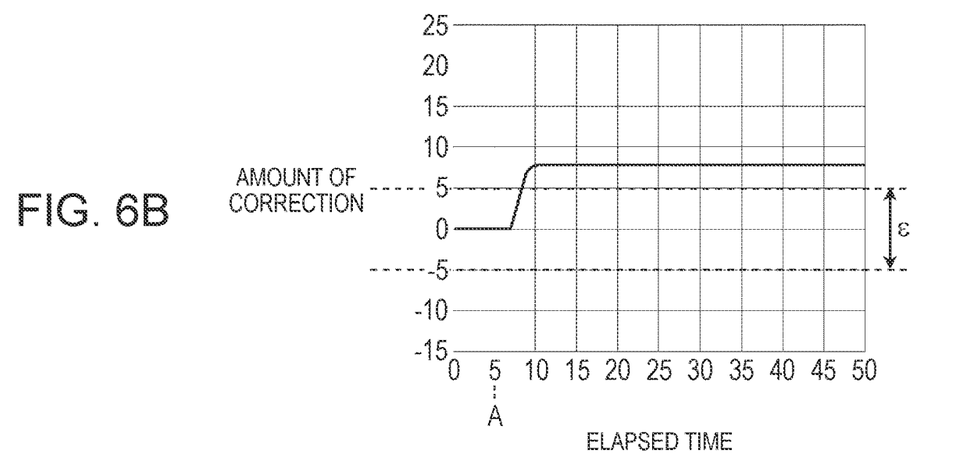
FIG. 6B is a schematic diagram illustrating an example of a temporal change of the amount of correction in a correction command generated by a correction command generator according to exemplary embodiment.

FIG. 6B is a schematic diagram illustrating an example of a temporal change of the amount of correction in the correction command generated by correction command generator 30 when motor control device 10 performs the position deviation correction processing in positioning system 1 causing the non-positioning target position deviation illustrated in FIG. 4B. FIG. 6B has a horizontal axis representing elapsed time, and a vertical axis representing the amount of correction.

Figure 6C:
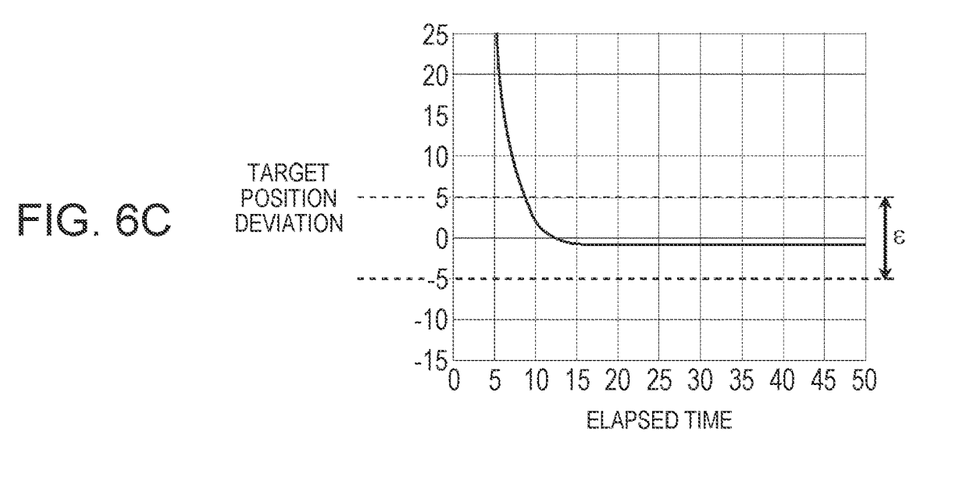
FIG. 6C is a schematic diagram illustrating an example of a state in which a load according to an exemplary embodiment is positioned within a predetermined range from a target position.

FIG. 6C is a schematic diagram illustrating an example of a state in which load 80 is positioned at the target position when motor control device 10 performs the position deviation correction processing in positioning system 1 causing the non-positioning target position deviation illustrated in FIG. 4B. FIG. 6C has a horizontal axis representing elapsed time, and a vertical axis representing target position deviation.

When the amount of change per part time of the target position deviation calculated by the target position deviation calculator 60 decreases after time having elapsed from just time A as illustrated in FIG. 4B, the predicted target position deviation calculated by prediction part 20 gradually changes to a larger value as illustrated in FIG. 6A. Then, when the predicted target position deviation exceeds predicted target position deviation B, i.e., when the predicted target position deviation starts to indicate that load 80 does not reach the target position, correction command generator 30 starts to generate a correction command that allows the amount of correction to be the predicted target position deviation as illustrated in FIG. 6B. Subsequently, correction command generator 30 updates and outputs the correction command to maintain a maximum value of a correction value. Controller 50 controls motor 70 so that motor 70 moves to a position instructed by the corrected position command corrected in response to the correction command to maintain the maximum value of the correction value. This control allows load 80 to be positioned within a predetermined range from the target position as illustrated in FIG. 6C.

<Consideration>

As described above, motor control device 10 calculates the target position deviation, acquires the target settling time, and corrects the position command based on the calculated target position deviation and the acquired target settling time. Thus, information related to load 80 does not need to be fed back to host controller 11 that gives a position command to motor control device 10. Then, motor control device 10 is capable of controlling motor 70 to achieve quick positioning of load 80 within a predetermined range from the target position. Motor control device 10 also does not necessarily need to decelerate positioning speed of load 80 even when load 80 approaches the target position. Thus, motor control device 10 is capable of controlling the motor to achieve quicker positioning of load 80 within the predetermined range from the target position.

(Supplementary)

Although the motor control device according to an aspect of the present disclosure has been described above based on the exemplary embodiments, the present disclosure is not limited to the exemplary embodiments. Configurations in which various variations conceived by those skilled in the art are applied to the exemplary embodiments, and an aspect formed by combining components in different exemplary embodiments may be included within the scope of one or more aspects of the present disclosure, without departing from the gist of the present disclosure. Hereinafter, another configuration example of the motor control device according to an aspect of the present disclosure will be described.

(1) First Another Configuration Example

Prediction part 20 has been described in the exemplary embodiments in which predicted target position deviation $p_k$ is calculated by performing linear interpolation using, for example, imaging time $t_{k-1}$ of a (k−1)-th image captured by camera 61, an imaging time $t_k$ of a k-th image captured by camera 61, target position deviation $d_{k-1}$ corresponding to the (k−1)-th image captured by camera 61, and target position deviation $d_k$ corresponding to the k-th image captured by camera 61. That is, prediction part 20 has been described assuming that the predicted target position deviation is calculated by performing linear interpolation using first time ($t_{k-1}$), second time ($t_k$), the first target position deviation (target position deviation $d_{k-1}$), and the second target position deviation (target position deviation $d_k$).

Figure 10:
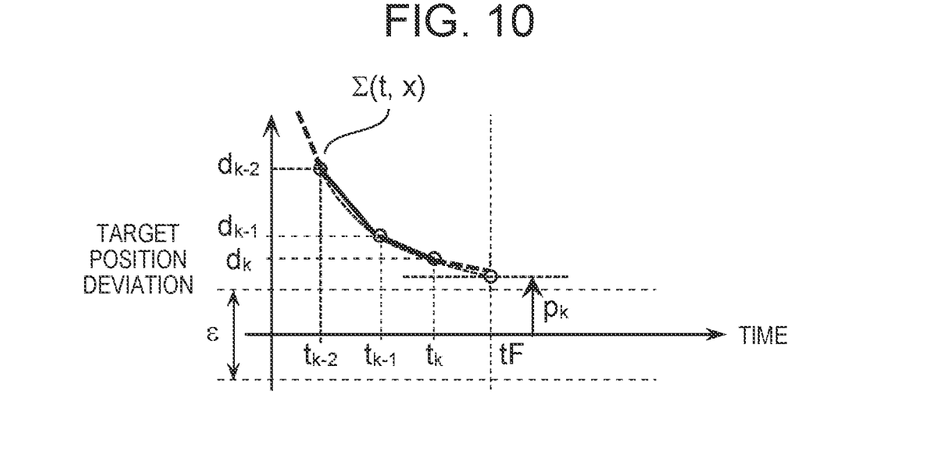
FIG. 10 is a diagram illustrating a case where a predicted target position deviation is calculated by performing secondary interpolation in a first other configuration example of a motor control device according to an aspect of the present disclosure.

Alternatively, prediction part 20 may calculate predicted target position deviation $p_k$ by performing secondary interpolation as illustrated in FIG. 10 as a first another configuration example. FIG. 10 is a diagram illustrating a case where the predicted target position deviation is calculated by performing the secondary interpolation in another configuration example. The secondary interpolation uses data including: imaging time $t_{k-2}$ of a (k−2)-th image captured by camera 61 and target position deviation $d_{k-2}$ corresponding to the image; imaging time $t_{k-1}$ of a (k−1)-th image captured by camera 61 and target position deviation $d_{k-1}$ corresponding to the image; and imaging time $t_k$ of a k-th image captured by camera 61 and target position deviation $d_k$ corresponding to the k-th image captured by camera 61, for example. That is, prediction part 20 may calculate predicted target position deviation $p_k$ by performing secondary interpolation using first time ($t_{k-2}$), second time ($t_{k-1}$), third time ($t_k$), the first target position deviation (target position deviation $d_{k-2}$), the second target position deviation (target position deviation $d_{k-1}$), and the third target position deviation (target position deviation $d_k$). FIG. 10 illustrates function $\Sigma(t, x)$ that indicates the position command and that is corrected by $p_k$ at time $t_k$ to form function $\Sigma(t, x)-p_k$. After time $t_k$, load 80 is positioned along function $\Sigma(t, x)-p_k$ indicating the position command, according to the flowchart illustrated in FIG. 5.

The predicted target position deviation can be also calculated by linear interpolation or secondary interpolation using four or more times and four or more target position deviations corresponding to the respective four or more times. Additionally, the predicted target position deviation can be calculated by performing multi-order interpolation, exponential function approximation, approximation based on a transfer function that simulates responsiveness of controller 50, and the like using all the data acquired in the past until the target position is reached.

(2) Second Another Configuration Example

Correction command generator 30 has been described in the exemplary embodiments in which the correction command is generated when the predicted target position deviation indicates that the load does not reach the target position (does not exceed the target position).

Alternatively, correction command generator 30 may generate the correction command when the predicted target position deviation indicates that the load does not reach within a predetermined range from the target position, for example, as another configuration example. As a result, the correction command is generated earlier than the exemplary embodiments to perform correction operation earlier than that in the exemplary embodiments, so that the load can reach within the predetermined range earlier.

(3) Third Another Configuration Example

Motor control device 10 has been described in the exemplary embodiments in which motor control device 10 is provided inside with target position deviation calculator 60 that calculates the target position deviation, and prediction part 20 acquires the target position deviation calculated by target position deviation calculator 60.

Alternatively, motor control device 10 may not include target position deviation calculator 60, and prediction part 20 may acquire the target position deviation from an external device of motor control device 10, as another configuration example.

(4) Fourth and Fifth Another Configuration Examples

Correction command generator 30 has been described in the exemplary embodiments in which a correction command for correcting the position command is generated to instruct a correction command position shifted from the command position instructed by the position command by the predicted target position deviation.

Figure 11:
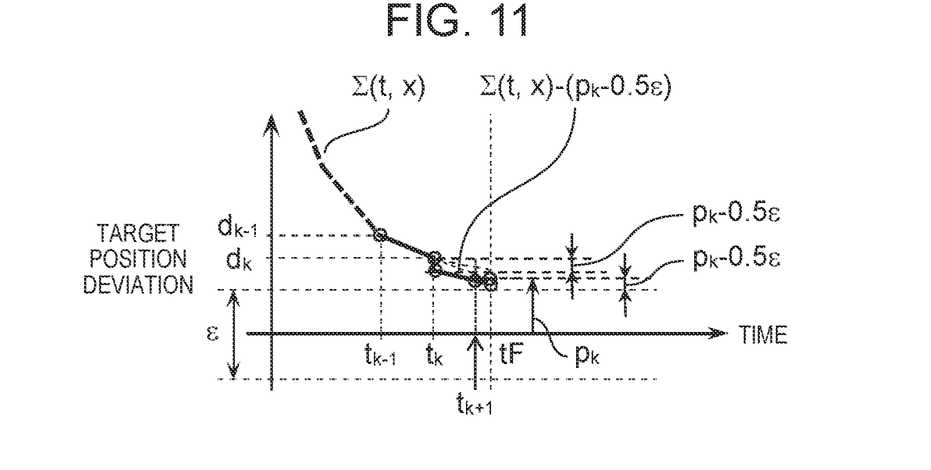
FIG. 11 is a diagram illustrating a case where another predicted target position deviation is calculated in a fourth other configuration example of a motor control device according to an aspect of the present disclosure.
Figure 12:
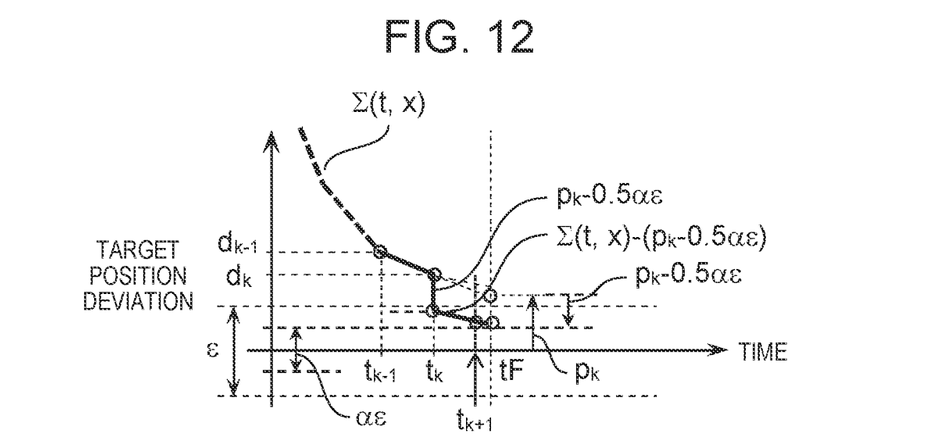
FIG. 12 is a diagram illustrating a case where yet another predicted target position deviation is calculated in a fifth other configuration example of a motor control device according to an aspect of the present disclosure.

Alternatively, the correction command for correcting the position command may be generated to instruct a correction command position shifted by a difference between the predicted target position deviation and a predetermined range as illustrated in FIG. 11, or a difference between the predicted target position deviation and a value obtained by multiplying the predetermined range by a predetermined value more than 0 and less than or equal to 1 as illustrated in FIG. 12.

FIG. 11 is a diagram illustrating a fourth another configuration example in which the position command is corrected with the difference between the predicted target position deviation and the predetermined range. FIG. 12 is a diagram illustrating a fifth another configuration example in which the position command is corrected with the difference between the predicted target position deviation and the value obtained by multiplying the predetermined range by the predetermined value more than 0 and less than or equal to 1.

FIG. 11 illustrates a case where the correction value at time $t_k$ is $(p_k - 0.5\varepsilon)$. In this case, function $\Sigma(t, x)$ indicating the position command is corrected by $(p_k - 0.5\varepsilon)$ at time $t_k$ to form $\Sigma(t, x) - (p_k - 0.5\varepsilon)$. After time $t_k$, load 80 is positioned along function $\Sigma(t, x) - (p_k - 0.5\varepsilon)$ indicating the position command, according to the flowchart illustrated in FIG. 5.

FIG. 12 illustrates a case where the correction value at time $t_k$ is $(p_k - 0.5\alpha\varepsilon)$, $\alpha$ being a constant satisfying $0 < \alpha \leq 1$. In this case, function $\Sigma(t, x)$ indicating the position command is corrected by $(p_k - 0.5\alpha\varepsilon)$ at time $t_k$ to form $\Sigma(t, x) - (p_k - 0.5\alpha\varepsilon)$. After time $t_k$, load 80 is positioned along function $\Sigma(t, x) - (p_k - 0.5\alpha\varepsilon)$ indicating the position command, according to the flowchart illustrated in FIG. 5.

Although a position of the load after stop is within the predetermined range in the exemplary embodiments, the correction command is too large, and thus the load exceeds the target position as illustrated in FIG. 6C. Then, performing the above processing reduces the amount of correction to a value smaller than the value illustrated in FIG. 6B, so that the load can be stopped without exceeding the target position.

INDUSTRIAL APPLICABILITY

The present disclosure is widely applicable to a motor control device that controls a motor.

REFERENCE MARKS IN THE DRAWINGS 1 positioning system
10 motor control device
11 host controller
20 prediction part
21, 31, 41, 63 processor
22, 32, 42, 64, 68 memory
30 correction command generator
40 corrector
50 controller
51 inverter
52 controller
60 target position deviation calculator
61 camera
62 calculator
66 lens
67 solid-state imaging element
70 motor
71, 72 connecting part
80 load
90 motor position detector
100 guide
110 stage
120 work object
130 field of view

The invention claimed is:

1. A motor control device configured to control a motor that moves a load to a target position based on a position command for instructing a position of the motor, the motor control device comprising:

a prediction part that acquires multiple target position deviations each indicating a difference between a position of the load and the target position at a corresponding one of multiple times, and a target settling time indicating a target time at which the motor positions the load at the target position, and that calculates a predicted target position deviation indicating a difference between a position of the load at the target settling time and the target position based on the multiple target position deviations and the target settling time;

a correction command generator that generates a correction command for correcting the position command based on the predicted target position deviation when the predicted target position deviation indicates that the load does not reach within a predetermined range from the target position;

a corrector that acquires the position command, corrects the position command based on the correction command, and generates a corrected position command; and a controller that controls the motor based on the corrected position command and a position of the motor, wherein:

the multiple target position deviations include a first target position deviation at a first time and a second target position deviation at a second time, and the prediction part calculates the predicted target position deviation based on the first time, the second time, the first target position deviation, and the second target position deviation.

2. The motor control device according to claim 1, wherein the prediction part calculates the predicted target position deviation by linear interpolation performed using the first time, the second time, the first target position deviation, and the second target position deviation.

3. The motor control device according to claim 1, wherein:
the multiple target position deviations further include a third target position deviation at a third time, and
the prediction part calculate the predicted target position deviation by secondary interpolation performed using the first time, the second time, the third time, the first target position deviation, the second target position deviation, and the third target position deviation.

4. The motor control device according to claim 1, wherein the correction command instructs a correction command position shifted from a command position instructed by the position command by the predicted target position deviation.

5. The motor control device according to claim 1, wherein the correction command instructs a correction command position shifted from a command position instructed by the position command by a difference between the predicted target position deviation and the predetermined range.

6. The motor control device according to claim 1, wherein the correction command instructs a correction command position shifted from a command position instructed by the position command by a difference between the predicted target position deviation and a value obtained by multiplying the predetermined range by a predetermined value more than 0 and less than or equal to 1.

7. The motor control device according to claim 1, further comprising a target position deviation calculator that calculates the multiple target position deviations, the target position deviation calculator including
a camera that is positioned together with the load by the motor, and captures images at respective multiple times, and
a calculator that calculates one target position deviation corresponding to one of the images, the one target position deviation being included in the multiple target position deviations, when the target position is included in the one of the images based on the images captured by the camera.

8. A motor control device configured to control a motor that moves a load to a target position based on a position command for instructing a position of the motor, the motor control device comprising:
a prediction part that acquires one or more target position deviations each indicating a difference between a position of the load and the target position at a corresponding one of one or more times, and a target settling time indicating a target time at which the motor positions the load at the target position, and that calculates a predicted target position deviation indicating a difference between a position of the load at the target settling time and the target position based on the one or more target position deviations and the target settling time;
a correction command generator that generates a correction command for correcting the position command based on the predicted target position deviation when the predicted target position deviation indicates that the load does not reach within a predetermined range from the target position;
a corrector that acquires the position command, corrects the position command based on the correction command, and generates a corrected position command; and
a controller that controls the motor based on the corrected position command and a position of the motor,
wherein the correction command instructs a correction command position shifted from a command position instructed by the position command by the predicted target position deviation.

9. A motor control device configured to control a motor that moves a load to a target position based on a position command for instructing a position of the motor, the motor control device comprising:
a prediction part that acquires one or more target position deviations each indicating a difference between a position of the load and the target position at a corresponding one of one or more times, and a target settling time indicating a target time at which the motor positions the load at the target position, and that calculates a predicted target position deviation indicating a difference between a position of the load at the target settling time and the target position based on the one or more target position deviations and the target settling time;
a correction command generator that generates a correction command for correcting the position command based on the predicted target position deviation when the predicted target position deviation indicates that the load does not reach within a predetermined range from the target position;
a corrector that acquires the position command, corrects the position command based on the correction command, and generates a corrected position command; and
a controller that controls the motor based on the corrected position command and a position of the motor,
wherein the correction command instructs a correction command position shifted from a command position instructed by the position command by:
a difference between the predicted target position deviation and a value determined based on the predetermined range, or
a difference between the predicted target position deviation and a value obtained by multiplying the predetermined range by a predetermined value more than 0 and less than or equal to 1.

10. The motor control device according to claim 9, wherein the difference between the predicted target position deviation and the value determined based on the predetermined range is used for the correction command position.

11. The motor control device according to claim 9, wherein the difference between the predicted target position deviation and the value obtained by multiplying the predetermined range by the predetermined value more than 0 and less than or equal to 1 is used for the correction command position.

* * * * *